US006223801B1

(12) United States Patent
Mitchell

(10) Patent No.: US 6,223,801 B1
(45) Date of Patent: May 1, 2001

(54) TOOL FOR HANGING WALLPAPER

(76) Inventor: Linda G. Mitchell, 3320 White Pine Dr., Nashville, TN (US) 37214

( * ) Notice: Subject to any disclaimer, the term of this patent is extended or adjusted under 35 U.S.C. 154(b) by 0 days.

(21) Appl. No.: 09/221,454

(22) Filed: Dec. 28, 1998

Related U.S. Application Data

(63) Continuation-in-part of application No. 08/634,682, filed on Apr. 18, 1996, now abandoned.

(51) Int. Cl.[7] .............................. B32B 31/00; B44C 7/02

(52) U.S. Cl. ....................... 156/574; 156/579; 15/236.01; 428/81

(58) Field of Search .................................. 428/81, 904.4; 52/DIG. 1; D8/45; 15/236.01, 236.02; D32/46; 156/574, 579

(56) References Cited

U.S. PATENT DOCUMENTS

| | | | | |
|---|---|---|---|---|
| D. 233,586 | * | 11/1974 | Kopp | D32/46 |
| D. 241,603 | * | 9/1976 | MacNeil | D32/46 |
| D. 276,564 | * | 11/1984 | Leininger | D32/46 |
| D. 285,014 | * | 8/1986 | Maciel | D32/46 |
| D. 290,056 | * | 5/1987 | Hatfield | D32/46 |
| D. 332,160 | * | 12/1992 | Kuzma | D32/46 X |
| D. 352,426 | * | 11/1994 | Tucker | D32/46 X |
| D. 352,432 | | 11/1994 | Monroe . | |
| D. 403,815 | * | 1/1999 | Inerbickler | D32/46 |
| D. 426,758 | * | 6/2000 | Mitchell | D8/14 |
| D. 428,315 | * | 7/2000 | Baker | D8/14 |
| 3,674,610 | * | 7/1972 | Bennett | 156/579 |
| 3,774,252 | | 11/1973 | Cantales . | |
| 3,862,495 | | 1/1975 | Markert . | |
| 3,924,328 | | 12/1975 | Mould . | |
| 4,041,605 | | 8/1977 | Selfridge . | |
| 4,043,038 | | 8/1977 | Selfrdige . | |
| 4,095,340 | | 6/1978 | Kingsley . | |
| 4,236,956 | | 12/1980 | Harrison et al. . | |
| 4,490,198 | | 12/1984 | Mitchell . | |
| 4,589,207 | | 5/1986 | Loth et al. . | |
| 4,667,409 | | 5/1987 | D'Amato . | |
| 4,759,441 | | 7/1988 | Leurck . | |
| 4,817,290 | | 4/1989 | Baughman . | |
| 4,856,191 | | 8/1989 | Weber . | |
| 4,867,085 | | 9/1989 | Brace et al. . | |
| 5,033,200 | | 7/1991 | Leung . | |
| 5,050,306 | | 9/1991 | Renaud . | |
| 5,181,320 | | 1/1993 | Tucciarone . | |
| 5,242,732 | | 9/1993 | Bahakel . | |
| 5,580,608 | | 12/1996 | Capoccia . | |

* cited by examiner

*Primary Examiner*—Mark A. Osele
(74) *Attorney, Agent, or Firm*—Gifford, Krass, Groh, Sprinkle, Anderson & Citkowski, P.C.

(57) ABSTRACT

A hand-held combination tool symmetrically adapted for either left-handed or right-handed use, used to smooth wallcoverings, butt and set seams, and serves as a cutting guide for a blade. All edges of the symmetrical design are perfectly straight. The nature of the acrylic substance designed with distinct form and beveled and rounded edges permits the tool to glide easily over all types of wallcoverings without marring or tearing the surface; speeds the hanging process by combining the functions of multiple tools into a single tool; increases the user's ability to smooth the wallcovering to conform to the surface to which it is applied; increases the user's ability to "work" the seam so that it is tightly butted and set; and the transparent acrylic combination allows user to more clearly see the surface to define the cutting edge and serves as a sliding trim guide resulting in a professional finish. Thus, the tool provides an improved method for applying wallcovering quickly, efficiently, and correctly.

22 Claims, 8 Drawing Sheets

FIG-1
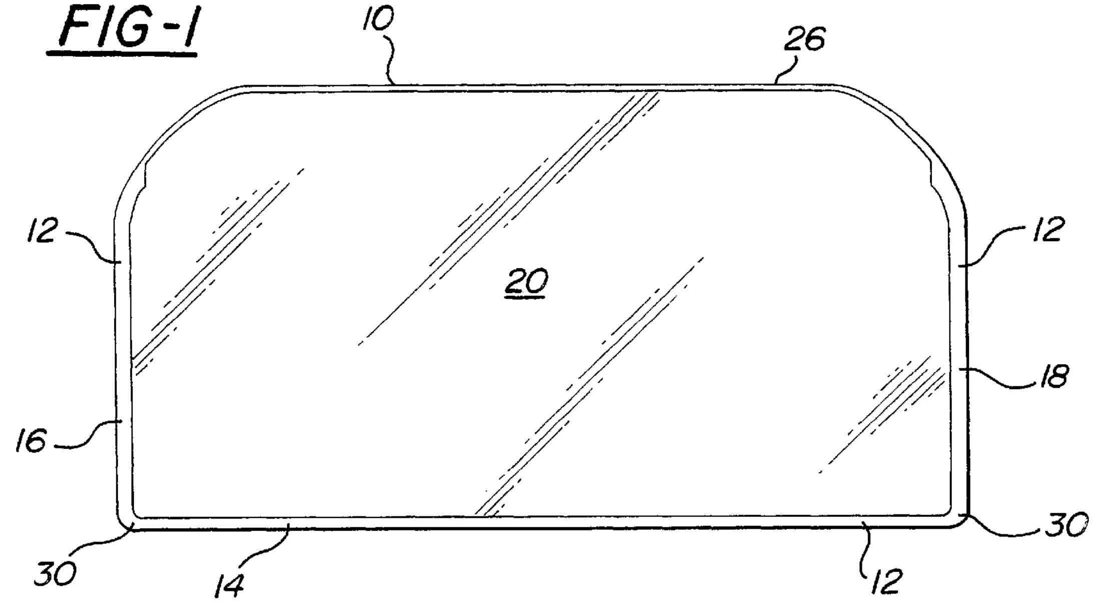
FIG-2
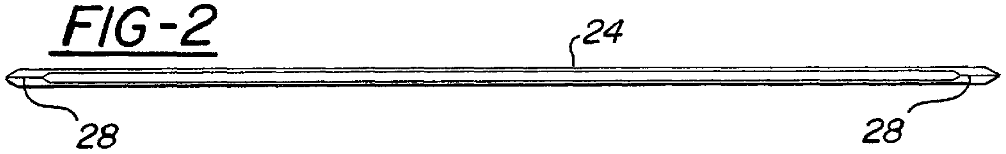
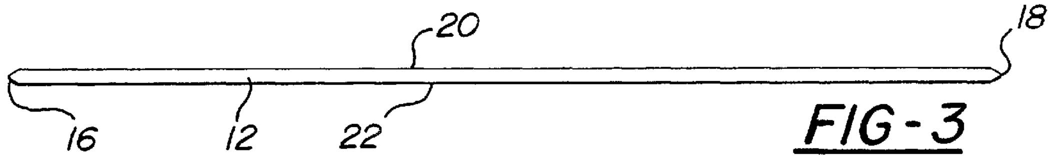
FIG-3
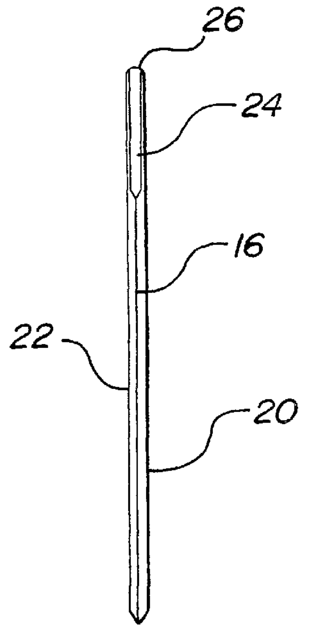
FIG-4

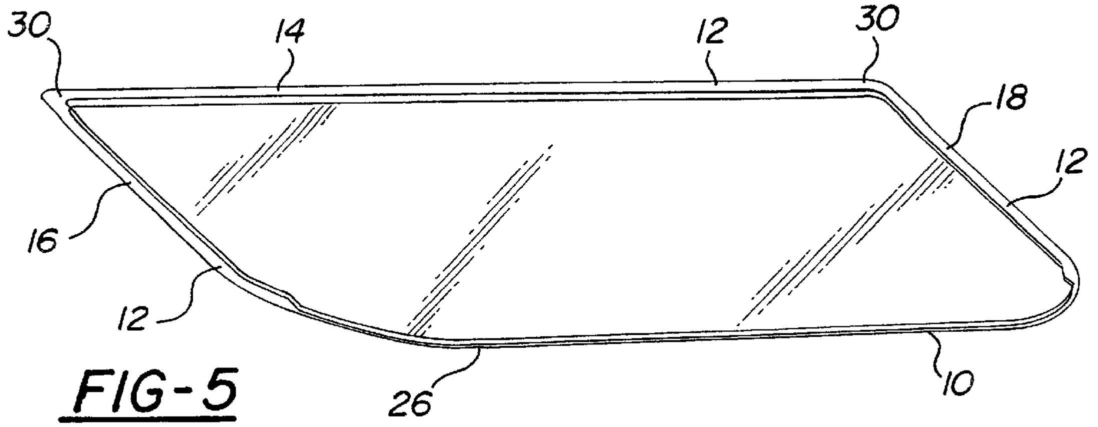
FIG-5
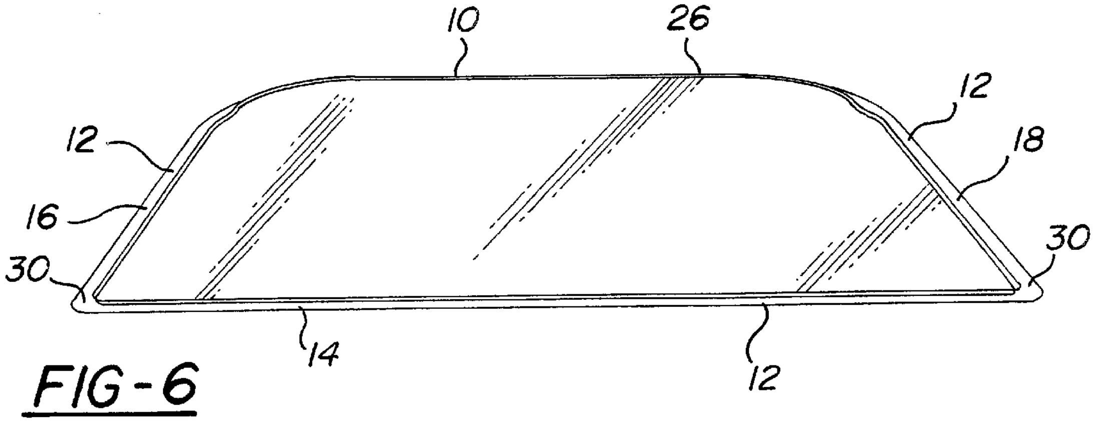
FIG-6
FIG-8
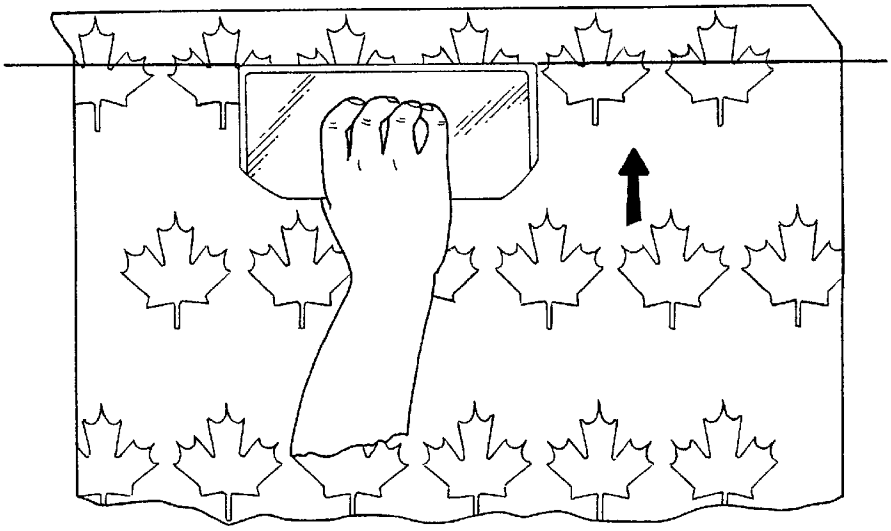

TOOL FOR HANGING WALLPAPER

CROSS REFERENCE TO RELATED APPLICATIONS

The present application is a continuation-in-part of U.S. application Ser. No. 08/634,682, filed Apr. 18, 1996 now abandoned.

BACKGROUND OF THE INVENTION

I. Field of the Invention

The present invention relates generally to tools and devices used to hang wallcoverings such as wallpaper, but more particularly to such hand held tools and devices for smoothing and seam setting of wallcoverings, as well as guiding a cutter when trimming wallcoverings such as wallpaper.

II. Description of the Related Art

The related art of hanging wallcoverings involved the use of a smoothing brush, smoother, a broad knife, a sponge or cloth, a seam roller, and a cutting tool. The user was required to hang the wallcovering, using the brush in an upward or downward motion to smooth out air pockets, butt the edges, set the seams with a seam roller, and using the broad knife as a blind guide, trim the wallcovering.

The aforesaid smoothing, butting and setting of seams, and trimming aspects of hanging wallcoverings are difficult, time-consuming, and particularly inefficient, which sometimes results in unsightly errors leaving an unprofessional finish. The use of a brush, smoother, or a broad knife in smoothing wallcoverings without marring or tearing the surface is a continuing problem; manipulation of the wallcovering to conform to the wall or butt the seam by use of the brush or broad knife is limited by the sharp edges of the broad knife and by the lack of rigidity of the bristles of the brush. Consequently, numerous attempts have been made to invent tools and methods that will allow the skilled and the nonskilled to hang wallcoverings quickly and professionally. Examples of such attempts are disclosed in U.S. Pat. Nos. 4,490,198 (Mitchell), D297,801 (Olsson), D282,622 (Bobo), 5,181,320 (Tucciarone), 3,500,540 (Lundquist), and 4,077,124 (Christmann).

Mitchell and Bobo disclose a wallpaper hanger having an elongated edge as a guide over which paper is drawn and then clamped, a handle is centrally attached to this guide plate assembly then the device is used to position the paper on the wall and smoothed downward. In general this attempt to smooth wallcovering without a hands-on approach is both unpractical and unwieldy; its design would render the positioning of the wallpaper cumbersome. Additionally, the application of wallcovering involves more than downward motion and, in fact, requires multiple movements in order to conform the wallcovering to the wall.

Another relevant tool disclosed in Olsson's patent, describes an ornamental design for a wallpaper applying device. Although this device would provide a hands-on approach for smoothing wallpaper, the positioning of the hand required to clasp the tool would be burdensome and limits wrist movement, and its designed form with the squared smoothing edge and corners and the alternate design with a serrated edge increase the possibility of scratching and marring the paper, and the serrated edge would tend to leave air pockets. In addition, no means is provided by either of these tools for butting and setting seams or for use as a guide in trimming wallcovering.

It is a common practice to use a broad knife as a straight edge guide in conjunction with a razor blade to trim wallcoverings. Problems arise when duplicate moves required to reposition the broad knife leave the trimmed edge uneven. Lundquist, Tucciarone, and Christmann have provided hand tools that address the need for an improved method of trimming wallcovering. However, in most cases the trimming of wallcovering needs to be manipulated by hand and therefore, these devices would prove to be difficult to position and produce their own problems.

Tucciarone discloses a wallpaper trimming tool for trimming the edges of wallpaper comprising a handle having a blade member secured thereto with a guide edge of the blade member extending transversely of the handle and a pair of opposed arms slidably supported from the handle for movement longitudinally of the handle. A holder is provided on each arm for securing a razor blade therewith and the arms are urged to a retracted position in which the associated razor blades are juxtaposed on the blade member and do not project beyond the guide edge.

U.S. Pat. No. 4,236,956, granted to Harrison et al. and incorporated by reference as if fully set forth herein, is directed to a floor laying tool comprising a handle, a downwardly projecting shaft connected to one end of the handle, and a working plate portion. The lower end of the downwardly projecting shaft is connected to the top of the working plate portion. The working plate portion is generally triangular in shape with rounded corners.

One of the drawbacks associated with the tools disclosed by Tucciarone and Harrison et al. is that the user is not able to use all of the working surfaces and edges of the blade member or working plate portion interchangeably.

Current improvements in the art continue, but the one tool that can combine virtually every tool needed for hanging wallcovering has not yet been developed. U.S. Pat. No. 4,834,237 and U.S. Pat. No. 4,759,441 highlight the problems associated with the need for multiple tools, wherein the user needs a system or container for these tools.

The present invention provides a multi-function tool and method of use that overcomes the limitations of devices and methods of the related art.

The art to which the invention relates, therefore, includes the following patents:

| Patent Number | |
|---|---|
| D297,801 | D282,622 |
| 3,500,540 | 4,077,124 |
| 4,490,198 | 4,759,441 |
| 4,834,237 | 5,181,320 |

SUMMARY OF THE INVENTION

This present invention overcomes the drawbacks of the related art and meets the need for a more effective hanging and trimming device. By combining the function of essential paperhanging tools, the need for multiplicity of tools is eliminated and by the designed form, nature of substance of manufacture, and the method of use of this invention, the technique of applying wallcovering is improved.

The preferred embodiment of the tool is created from $1/8$" transparent acrylic to an overall finished dimension of $8\frac{1}{8}$" in length by $4\frac{3}{8}$" in height. Both corners of the bottom $8\frac{1}{8}$" smoothing/trim guide edge are rounded. Both corners of the top $8\frac{1}{8}$" edge are angled 45 degrees with the point of the angle forming 3" from the center intersecting the $4\frac{3}{8}$" edge at $2\frac{5}{8}$" from the bottom $8\frac{1}{8}$" edge. Both points of the two 45 degree angles are rounded. In a further preferred embodiment, the bevelled edges of the sides and bottom are somewhat rounded, as opposed to being straight. The top 6" side and the two 45 degree angled sides are symmetrically finished round on front and back. The bottom 8⅛" smoothing/trim guide side and the two 2⅝ trim guide sides are beveled symmetrically on the front and back with each side being a mirror image. The intersecting point of the bevels is round. That is, the oppositely disposed faces of the bevel intersect at a radiused or rounded tip, and the point at which the faces of the bevel intersect the front and back sides of the tool is also rounded. Accordingly, the intersecting points of adjacent surfaces of the tool are rounded to prevent tearing or puncturing of the wallcovering and to facilitate smoothing and seam butting. All edges of the formed symmetrical design are perfectly straight. The acrylic is lightweight, firm, resistant to damage and breakage, and is non-brittle.

The present invention is advantageous in that the nature of the acrylic substance, distinct form, with designed beveled and rounded edges permits the tool to glide easily over all types of wallcoverings without marring, tearing, puncturing, or lifting the surface, and increases user's ability to smooth the wallcovering to conform to the surface to which it is applied and to "work" the seam so that it is tightly butted and set. It is of particular significance that this invention eliminates the need for a smoothing brush, broad knife, trim guide, seam roller, and sponge (when sponge is used as a smoothing device). It is of major significance that this invention facilitates the precision butting and closure of seams as opposed to a brush or smoother which lack rigidity of substance or a designed beveled edge which would facilitate precision closure. It is of major significance that this invention is symmetrically adapted for either left-handed or right-handed use and fits comfortably in any size hand and does not limit wrist movement.

Significantly, the transparency and the nature of the substance of manufacture and the designed beveled cutting guide edge, provides the user with the ability to see the actual cutting edge, in lieu of the blind cutting guide of the broad knife. In the preferred embodiment, the tool is constructed of fluorescent acrylic. Accordingly, light transmits through the tool and reflects from the beveled edges of the tool, thus illuminating the adjacent wallcovering and enabling the user to perform precision cutting. Unlike tools having a metal or rubber working edge, which tend to "grip" the wallcovering, the smooth acrylic glides easily over the wallcovering and allows the user to leave a more uniform edge by trimming in a continuous motion using the tool as a sliding guide as opposed to the duplicate moves required to reposition the broad knife several times per strip of wallcovering. It is of particular significance that the designed beveled edge on the two short sides allows user to trim wallcovering in narrow spaces. Another important feature is the hardened nature of the acrylic beveled edge that is resistant to damage by the cutting knife.

The present invention may be summarized in a variety of ways, one of which is the following: a multi-purpose tool useful for hanging wallcovering, comprising a planar body having a top having a width, a bottom having a width, and spaced apart sides positioned between the top and the bottom, wherein the spaced apart sides and the bottom are substantially orthogonal and join at a first pair of spaced apart radiused corners, the spaced apart sides and top are substantially orthogonal and join at a second pair of spaced apart radiused corners, and the width of the bottom is greater than the width of the top; a peripheral edge comprising a top edge, a bottom edge and side edges defining the location of a front side and a back side substantially identical and parallel to the front side, wherein the width of the bottom is greater than; wherein the bottom edge and side edges are beveled to form oppositely disposed faces intersecting at a radiused tip enabling the user to angularly engage the wallcovering with the tool, and the top edge and the second pair of radiused corner are rounded; wherein the tool is symmetrical about a plane interpositioned between and parallel to the front side and the back side, and the spaced apart sides are symmetrical about a central axis from the top to the bottom; and wherein the body is constructed of a translucent material. The body is substantially rectangular and the second pair of spaced apart corners are angled 45 degrees relative to the top and the spaced apart sides.

The present invention may also be summarized in the following way: a multi-purpose tool useful for hanging a wallcovering, comprising a body having a planar front, a planar back, a top having a width, a bottom having a width, and spaced apart sides positioned between the top and the bottom, wherein the front and the back are symmetrical about a parallel plane through the center of the body and the spaced apart sides are symmetrical about a central axis from the top to the bottom, wherein the spaced apart sides and the bottom are substantially orthogonal and join at spaced apart pairs of radiused corners, wherein the width of the bottom is greater than the width of the top; an edge surrounding the periphery of the body; bevel means formed on the edge at the bottom, spaced apart sides, and at least one of the pairs spaced apart radiused corners for angularly engaging a wallcovering; and wherein the body is constructed of a translucent material.

Yet a third way of summarizing the present invention is as follows: a multi-purpose tool useful for hanging wallpaper, comprising a body having a top and a bottom substantially perpendicular to spaced apart parallel sides, a continuous edge comprising a top edge, a bottom edge, and side edges interpositioned between a front surface and a back surface; a first pair of spaced apart radiused corners formed at an intersection of the top and sides; a second pair of spaced apart radiused corners formed at an intersection of the bottom and the sides; wherein the edge along the top of the body and at the first pair of radiused corners is rounded, and the edge along the bottom and the spaced apart side edges is beveled to form oppositely disposed first and second wall-engaging surfaces merging at a radiused tip; wherein the tool is symmetrical about a plane parallel to and interpositioned between the front surface and the back surface enabling the user to engage the wallcovering interchangeably at any of the edges; and wherein the tool is constructed of a translucent material enabling the user to view the wallpaper through the tool during use.

The spaced apart pairs of radiused corners preferably have dissimilar radiuses. That is, the radius of the first pair of radiused corners is preferably smaller than the radius of the second pair of radiused corners. The body is preferably constructed of a translucent, fluorescent, rigid, acrylic material, and may include a straight edge portion to provide a guide for a wallcovering cutter. The top of the tool may further include the radiused bevel.

The objects, features and advantages of the present invention shall become apparent after consideration of the description set forth below, including the drawings, and the claims appended hereto. All such objects, features and advantages are believed to be within the scope of the present invention as represented by the claims set forth below.

BRIEF DESCRIPTION OF THE DRAWINGS

FIG. 1 is a front view of an embodiment of the present invention;

FIG. 2 is a top end view of the embodiment of the invention shown in FIG. 1;

FIG. 3 is a bottom end view of the embodiment of the invention shown in FIG. 1;

FIG. 4 is a side view of the embodiment of the invention shown in FIG. 1, wherein the opposing side edge is a mirror image of what is shown in this figure;

FIG. 5 is a perspective view of the embodiment shown in FIG. 1;

FIG. 6 is an alternate perspective view of the embodiment shown in FIG. 1;

FIG. 8 is a representational perspective view of the embodiment of the present invention shown in FIG. 1 used to press a wallcovering into an adjoining wall corner;

DETAILED DESCRIPTION OF THE PREFERRED EMBODIMENTS

Figure 7:
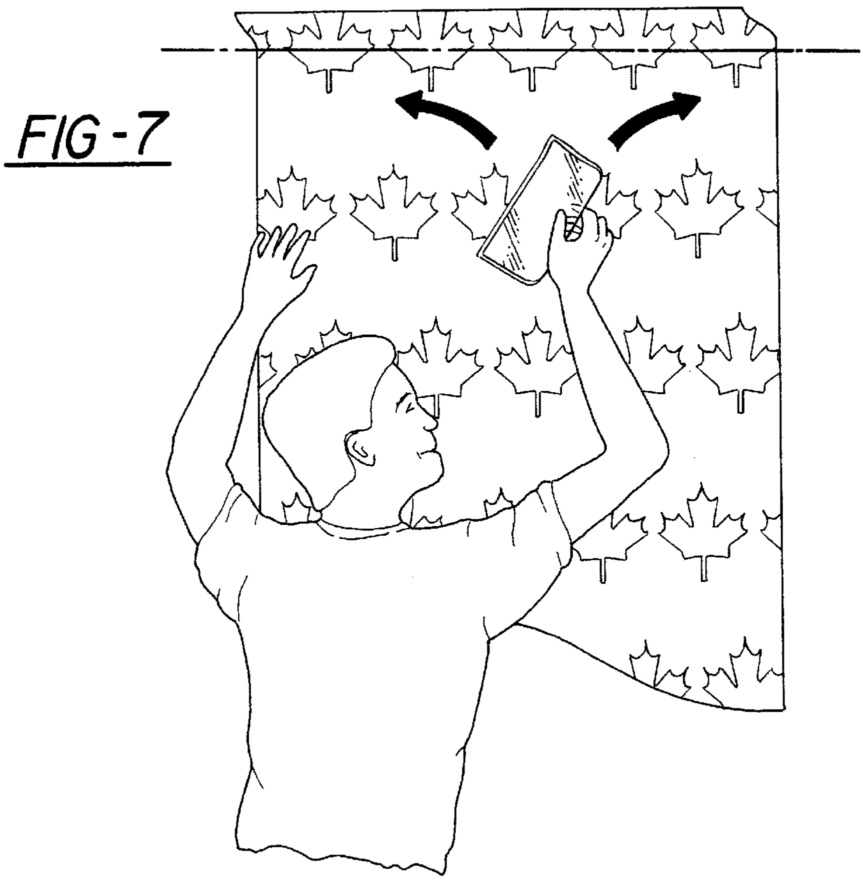
FIG. 7 is a representational perspective view of the embodiment of the present invention shown in FIG. 1 used in a smoothing operation.
Figure 9:
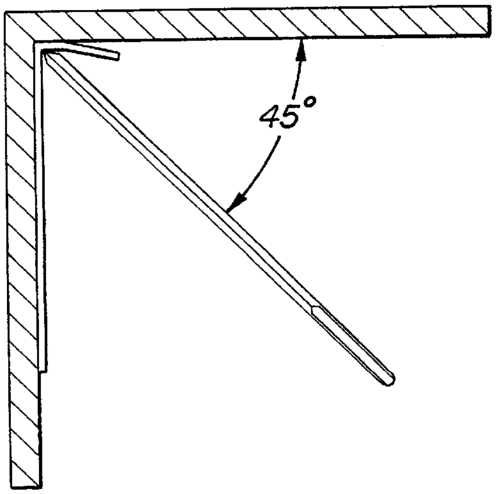
FIG. 9 is a representational perspective view of the embodiment of the present invention shown in FIG. 7 in relation to a wallcovering and a wall surface.
Figure 10:
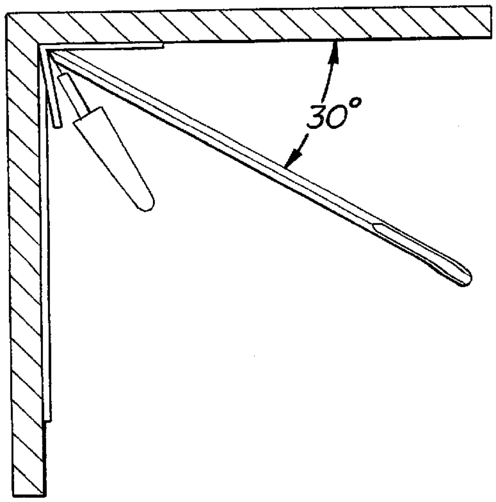
FIG. 10 is a representational perspective view of the embodiment of the present invention shown in FIGS. 11A and 11B in relation to a wallcovering and wall surface during a trimming operation.

Referring to the drawing FIGS. 1–6 the features of a preferred embodiment of the invention are labeled. Like structure or analogous structure shall have like numerals and references throughout the drawing examples. Accordingly, an embodiment of the inventive wallcovering hanging tool is designated generally by the reference numeral 10. The inventive tool is preferably constructed of a fluorescent translucent material such as acrylic or plastic, but may be made of any other suitable material. It is believed, however, that a translucent embodiment of the invention provides the user with more control over the task in which the tool is used. In additional preferred embodiments, a light emitting phosphorescent based material may be coated around the extending edges of the of the tool and acts to provide additional illumination. As will be described in the examples below, hanging wallcovering with a translucent embodiment of the tool enables the user to see the pattern of the wallcovering enabling the user to more easily determine the positioning of the wallcovering during the hanging operation.

A bevel 12 having oppositely disposed faces is formed on the bottom edge 14, and two spaced apart side edges 16 and 18. The front 20 is a symmetrical mirror image of the back side 22, and vice versa.

An intersection 24 between the bevel 12 of the sides 16 and 18, and the top 26 is preferably rounded and thus may not exhibit a line interface between that adjoining surface structure (see FIG. 4). In the alternative, however, the intersection 24 may have a centerline 28 if the intersection is not rounded (see FIG. 2).

The bottom edge 14 preferably has rounded corners 30 to prevent punctures of the skin of the user or the wallcovering. In some embodiments, however, it may prove advantageous to provide a “sharp” corner structure such as when wedging wallcoverings or other materials behind overlapping wall surfaces, door frames, etc. The corners 30, therefore, preferably form a curve with the sides 16 and 18. The corners 30 therefore exhibit a smaller selected radii as opposed to the more generally curved corners established between the top and the first and second sides. In the preferred embodiment, the bottom 14 is 8⅛" wide, and the portion of the top edge 26 which is parallel to the bottom edge 14 is 6" wide.

In the examples that follow, the an embodiment of the present invention is used to hang wallcovering, without the limitation or necessity of having and right device. That is, the symmetrical nature of the inventive device lends itself and is easily used by persons who are left or right handed.

EXAMPLE 1

Using the Tool to Hang the First Strip

With reference to FIG. 7, the beveled edge 12 is shown being used in multiple crescent-shaped sweeping motions to smooth flat the upper portion of the wallcovering to the wall; then using an upward horizontal stroke, smooth the upper portion of the strip to force it flat against the top of the wall (FIG. 8). Working in one foot sections, use multiple crescent-shaped sweeping motions and horizontal sweeping motions to smooth the middle and bottom sections.

Figure 11A:
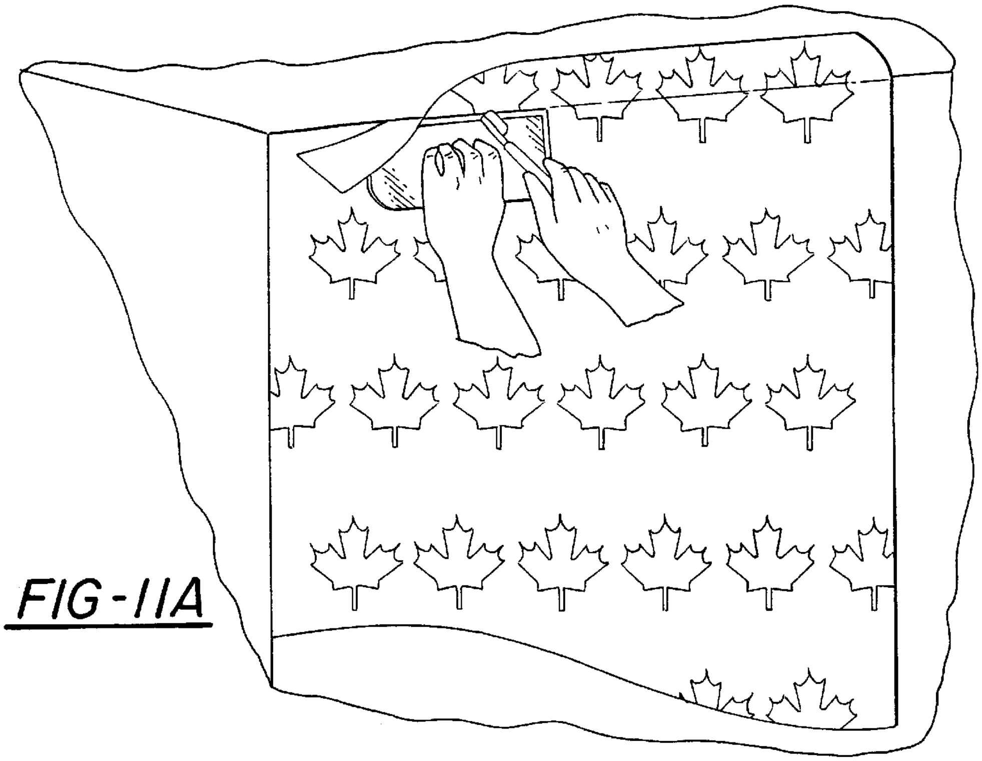
FIGS. 11A and 11B are representational perspective views of the embodiment of the present invention shown in FIG. 1 used in a trimming operation.
Figure 11B:
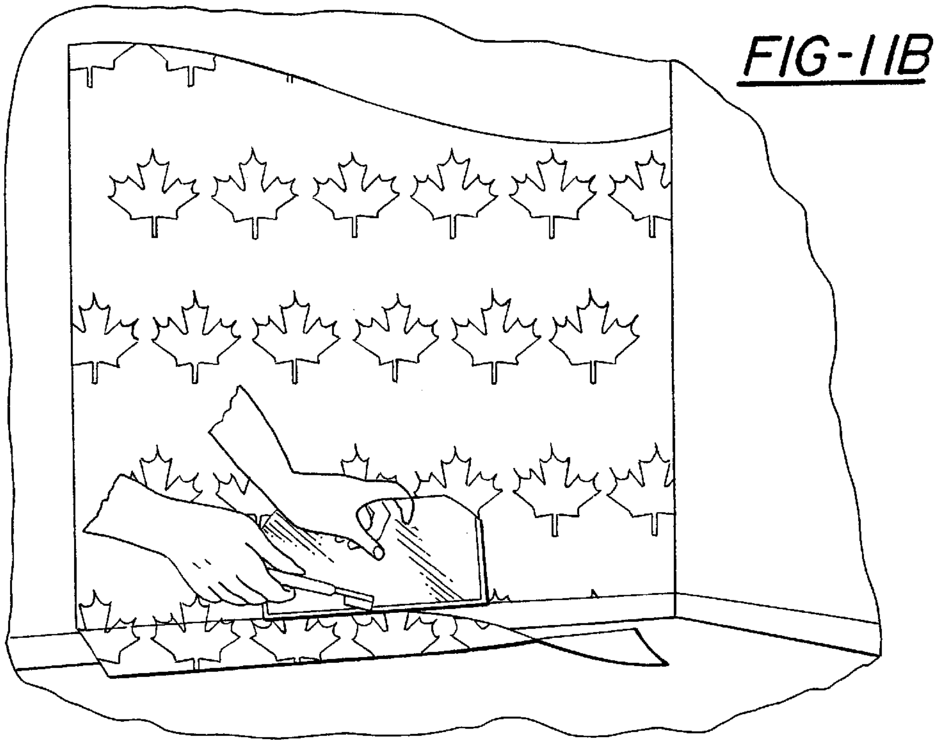

Use horizontal strikes in a downward motion to flatten against the bottom of the wall. The acrylic material in this tool allows the tool to actually glide across the wallcovering. Using the beveled edge 12 as a cutting guide, hold the tool firmly and place between the wallcovered wall and the razor knife. Using the tool as a sliding guide, trim the overlapping wallcovering at top and bottom (FIG. 11).

EXAMPLE 2

Closure of the Seams

Figure 12A:
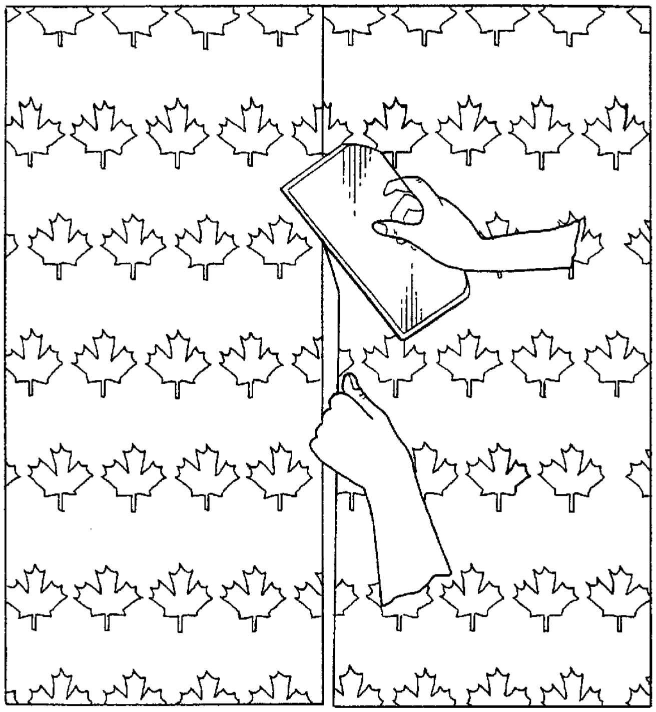
FIGS. 12A and 12B are representational perspective views of the embodiment of the present invention shown in FIG. 1 used in joining a seam between two opposing sheets of wallcovering.
Figure 12B:
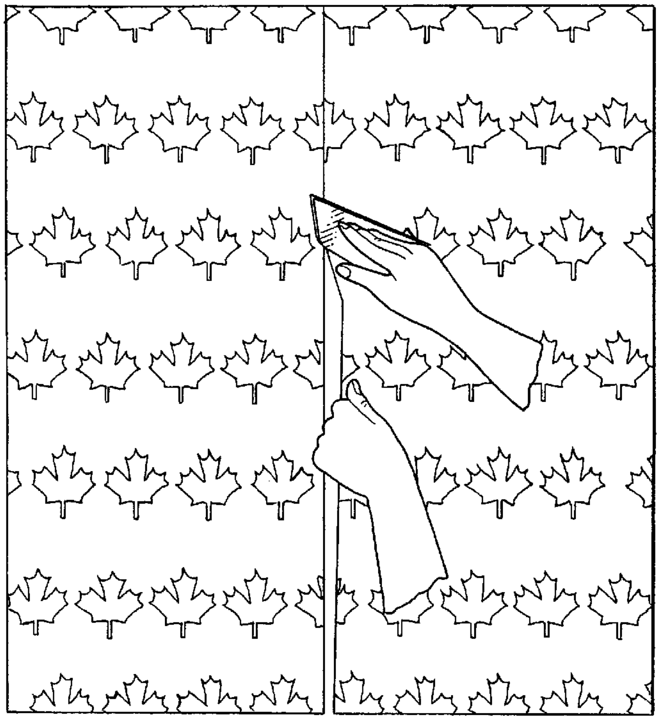

Once the wallcovering is in position with the pattern properly matched at the top, use the tool to help butt the two strips together (FIG. 12). The design of the beveled edge 12 and the rounded corners 30 and the acrylic composition of the tool allows the user to work the seam by either pushing the wallcovering at the joint for a tighter seam or pulling the wallcovering to prevent the slightest overlap without tearing or lifting the paper and set the seam by using the beveled edge 12 and rounded corner 30 with a horizontal downward or upward stroke. Working in one foot sections, butt and set the seam as described and then use the tool in multiple crescent-shaped motions and horizontal sweeping motions to flatten section to the wall as outlined in Example 1. Repeat the process until the bottom section is against the wall. Use the beveled edge 12 as a trim guide and trim the overlaps as described in Example 1.

EXAMPLE 3

Using the Tool to Hang Around Windows and Doors

Figure 13:
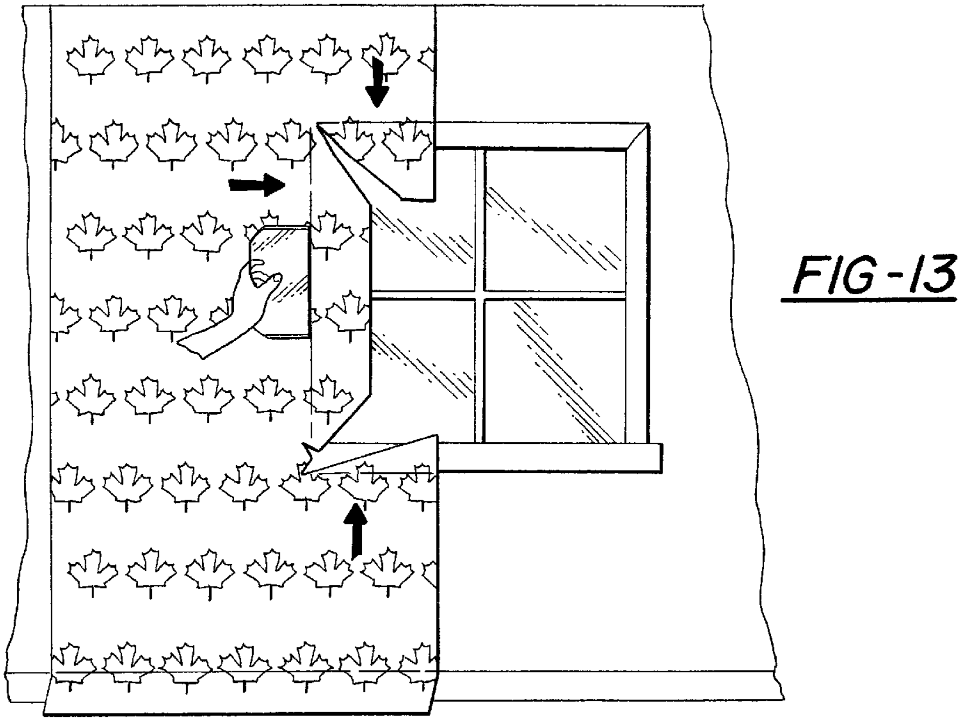
FIGS. 13 and 14 are representational perspective views of the embodiment of the present invention shown in FIG. 1 used to smooth a wallcovering into a corner and a trimming operation around a window.
Figure 14:
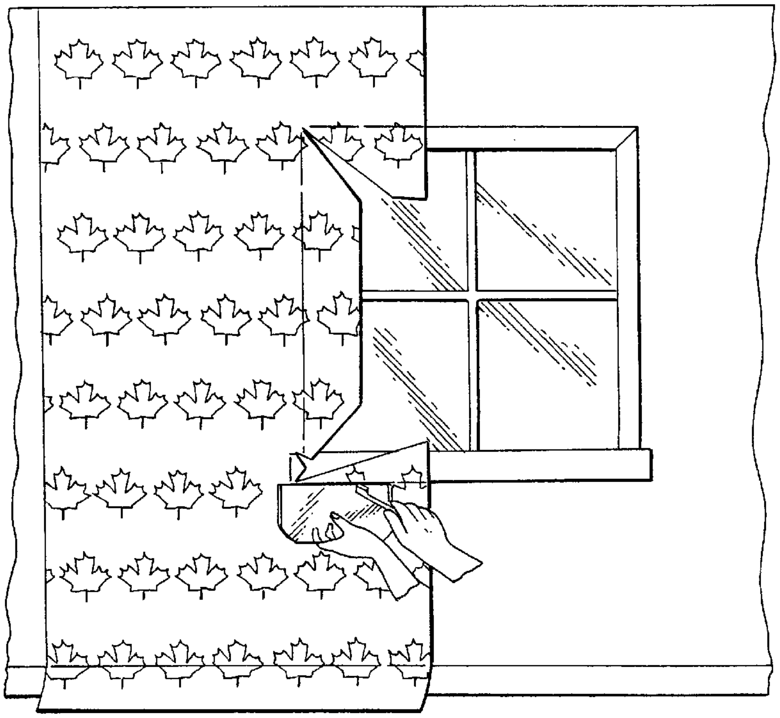

Repeat the process in either Example 1 or Example 2 as applicable, allowing strip of wallcovering to overlap door or window. Using the tool in multiple crescent-shaped strokes and horizontal strokes, smooth the wallcovering into the frame (FIG. 13). Place the beveled edge 12 of the tool between the wallcovered wall and the razor knife, and with continuous motions, use the tool as cutting guide to trim the overlaps (FIG. 14).

EXAMPLE 4

Using the Tool to Hang Inside Corners

Figure 15:
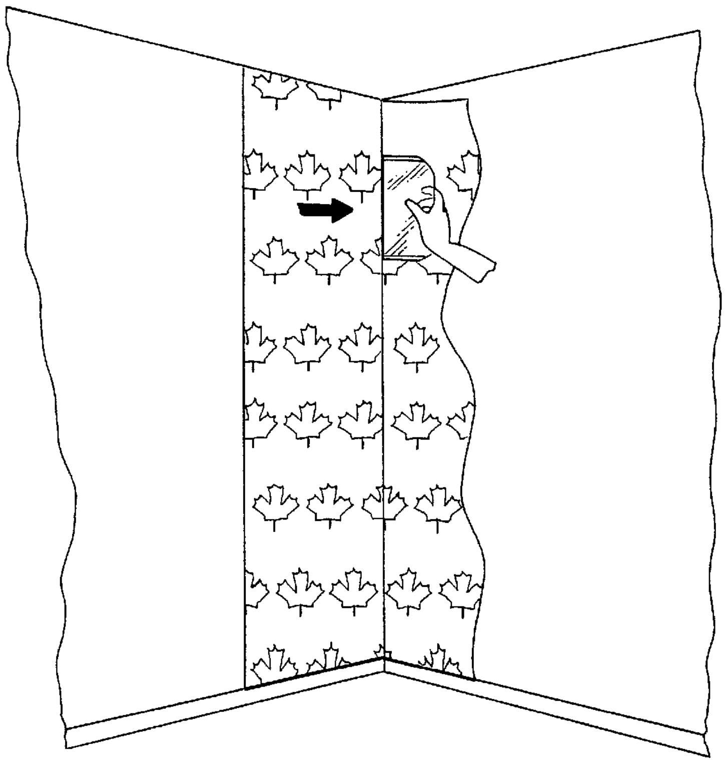
FIGS. 15 and 16 are representational perspective views of the embodiment of the present invention shown in FIG. 1 used to smooth a wallcovering into a corner and a trimming operation respectively.
Figure 16:
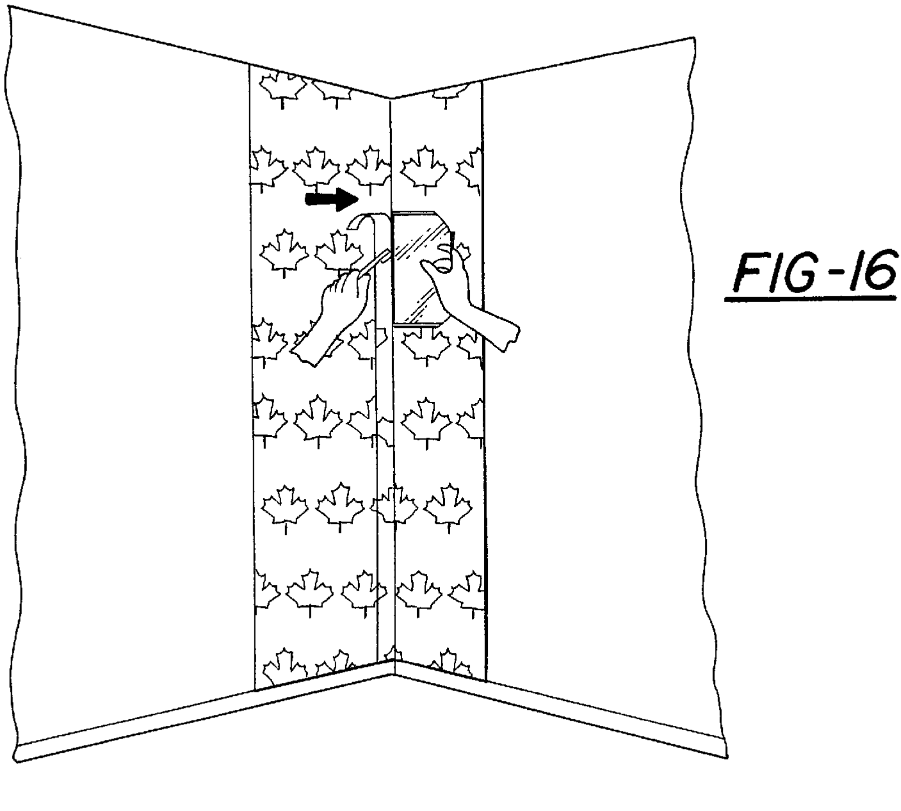

Using the hanging process as outlined in Examples 1 and 2 above, the tool is then used to smooth the wallcovering until it is flattened into the corner with the excess pressed loosely on the adjacent wall (FIG. 15). Using the beveled edge 12 as a cutting guide, the excess wallcovering is then trimmed away (FIG. 15). The excess wallcovering previously trimmed is then hung on the adjacent wall as descried in the above example. The tool is then placed into the corner between the last strip hung and the adjacent wallcovered surface and using the beveled edge 12 of the tool as a cutting guide trim any overlap in the corner (FIG. 16).

EXAMPLE 5

Using the Tool to Hang Outside Corners

Figure 17:
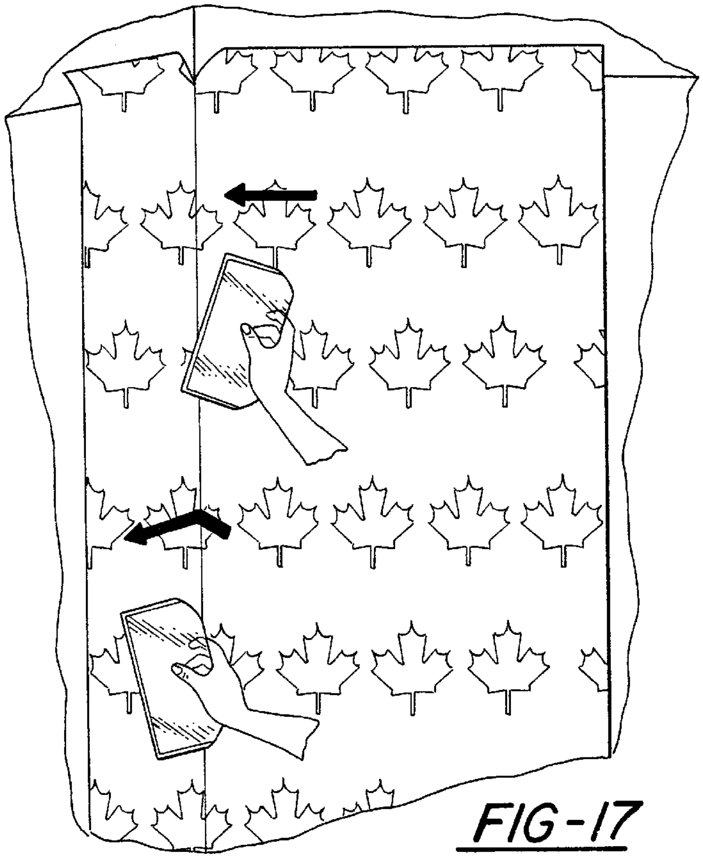
FIG. 17 is a representational perspective view of the embodiment of the present invention shown in FIG. 1 during a smoothing operation.

Outside corners can be wrapped with a full strip. Using the tool in crescent-shaped sweeping motions, push air pockets to the outside corner (FIG. 17). Pulling the strip snugly against the wall with one hand, use the tool in small crescent-shaped motions at the corner edge to mold wallcovering tight around corner and push any remaining air pockets to the outside (FIG. 17).

These basic techniques using this new invention can be applied to virtually any wallcovering example from wrapping window returns (casement) to hanging borders.

Figure 20:
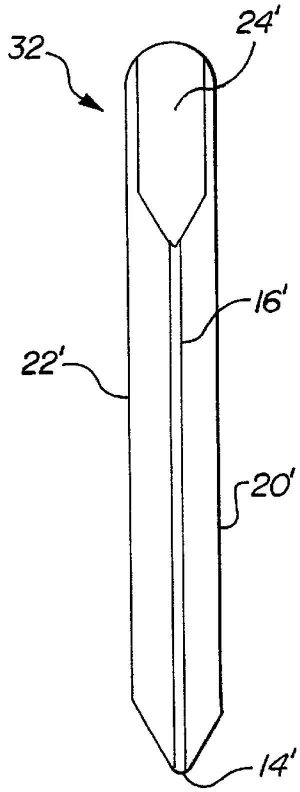
FIG. 20 is a side view of the embodiment of the invention shown in FIG. 18, wherein the opposing side edge is a mirror image of what is shown in this figure.
Figure 18:
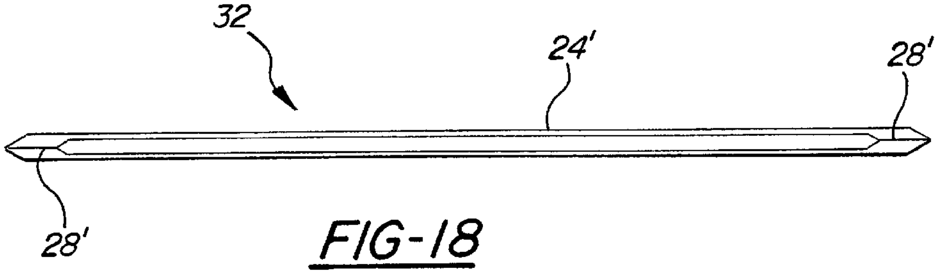
FIG. 18 is a top end view of a further preferred embodiment of the present invention in which a slight rounded radius is incorporated into the bevelled edge.
Figure 19:
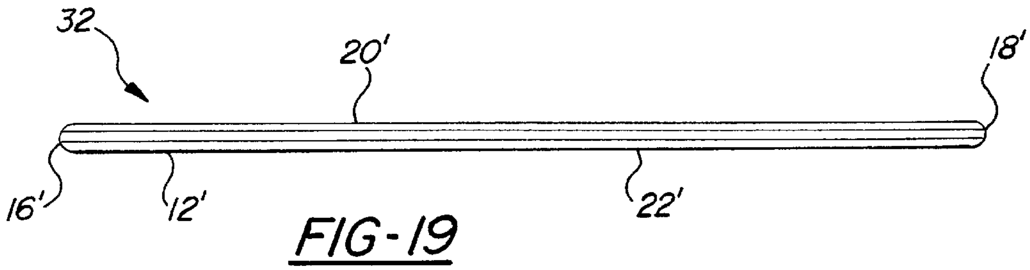
FIG. 19 is a bottom end view of the embodiment of the present invention illustrated in FIG. 18.

Referring now to FIGS. 18–20, a further preferred embodiment of the multi-purpose tool for hanging a wall covering is shown at 32. The tool 32 is similar to the tool 10 of the first embodiment and includes a bevel 12' which, unlike the straight edges of bevel 12 of the first embodiment, is rounded on both sides as viewed in the cross sectional illustrations to show first and second generally inwardly extending and sloping edges. As shown in the top, bottom and representative side views of FIGS. 18–20, the tool 32 otherwise again includes a bottom edge 14', spaced apart side edges 16' and 18', a front side 20', a back side 22', a rounded intersection 24' located between the bevel 12' of sides 16' and 18' and a top 26' and, finally, a centerline 28' in the region of the intersection 24' between the sides and top. The advantage of the rounded beveled edge 12' in the further preferred embodiment is that it provides enhanced smoothing action in certain applications which is desirous over the more sharp, inwardly angularly extending and straightened edges of the bevel 12 as shown in the first preferred embodiment.

The present invention therefore describes and illustrates a multi-purpose tool for hanging wall coverings. Additional preferred embodiments will become apparent to those skilled in the art to which it pertains without deviating from the scope of the appended claims.

I claim:

1. A multi-purpose tool for use in hanging a wallcovering, said tool comprising:

a body having a first substantially flattened and planar shaped side and a second substantially flattened and planar shaped side separated from said first side by an established thickness, said body further including a top, a first pair of spaced apart and radiused corners separating said top from first and second sides of said body, and a second pair of spaced apart and radiused corners separating said first and second sides from a bottom of said body, said first pair of radiused corners each having a first selected radii greater than a second selected radii corresponding to said second pair of radiused corners; and a substantially smooth and beveled edge extending along said bottom and said sides, a rounded intersection edge extending along said top between said first and second sides and interconnecting at opposite ends with said beveled edge and defining, in combination with said beveled edge, an outer periphery of said body;

said beveled and rounded intersection edges permitting said tool to glide easily over the wallcovering without marring, puncturing or tearing the wallcovering surface, said beveled and rounded intersection edges further increasing the user's ability to smooth the wallcovering to conform to the surface to which it is applied and tightly abut seams established between wallcovering pieces.

2. The tool according to claim 1, said bevelled edge further comprising a first angularly extending and straight edge and a second angularly extending and straight edge conjoining with said first edge.

3. The tool according to claim 1, said bevelled edge further comprising a first generally inwardly extending and sloping edge and a second generally inwardly extending and sloping edge conjoining with said first edge.

4. The tool according to claim 1, wherein said body is constructed of a translucent material.

5. The tool according to claim 4, wherein said translucent material is a rigid acrylic.

6. The tool according to claim 5, wherein said rigid acrylic material is fluorescent enabling light to be transmitted through said body to said edges of the body to illuminate said edges and an adjacent wallcovering.

7. The tool according to claim 4, wherein said body further includes a phosphorescent material coated around said bevelled edge and said rounded intersection edge.

8. The tool according to claim 1, wherein said top further includes the radiused bevel.

9. A multi-purpose tool useful for hanging a wallcovering, comprising:

a body having a planar front, a planar back, a top having a width, a bottom having a width, and spaced apart sides positioned between said top and said bottom, wherein said front and said back are symmetrical about a parallel plane through a center of said body and said spaced apart sides are symmetrical about a central axis from said top to said bottom, wherein said spaced apart sides and said bottom are substantially orthogonal and join at spaced apart pairs of radiused corners, wherein said width of said bottom is greater than said width of said top;

a first substantially smooth and beveled edge formed along said bottom, said spaced apart sides, and at least one of said pairs of spaced apart radiused corners for angularly engaging a wallcovering, a second edge extending along said top and at least another of said pairs of spaced apart radiused corners; and wherein the body is constructed of a translucent material;

said beveled edge permitting said tool to glide easily over the wallcovering without marring, puncturing or tearing the wallcovering surface, said beveled edge further increasing the user's ability to smooth the wallcovering to conform to the surface to which it is applied and tightly abut seams established between wallcovering pieces.

10. The tool according to claim 9, wherein said spaced apart pairs of radiused corners have dissimilar radiuses.

11. The tool according to claim 9, wherein said first bevelled edge further comprises a first angularly extending and straight edge and a second angularly extending and straight edge conjoining with said first edge.

12. The tool according to claim 9, wherein said first bevelled edge further comprises a first generally inwardly extending and sloping edge and a second generally inwardly extending and sloping edge conjoining with said first edge.

13. The tool according to claim 9, wherein said second edge further comprises a rounded intersection edge.

14. The tool according to claim 10, wherein said body is constructed of a translucent material.

15. The tool according to claim 11, wherein said translucent material is a rigid acrylic.

16. The tool according to claim 15, wherein said rigid acrylic material is fluorescent for transmitting light through said body to illuminate said edges and an adjacent wallcovering.

17. The tool according to claim 12, wherein said body is constructed of a translucent material.

18. The tool according to claim 12, wherein said translucent material is fluorescent acrylic enabling light to diffuse through said tool to illuminate said beveled edges of said tool and said adjacent wallcovering.

19. The tool according to claim 12, wherein said body further comprises a phosphorescent material coated around at least one of said first bevelled edge and said second edge.

20. The tool according to claim claim 9, further including straight edge means for establishing a guide for a wallcovering cutter.

21. A multi-purpose tool for use in hanging a wallcovering, said tool comprising:

a body constructed of a translucent material and having a first planar shaped side and a second planar shaped side separated from said first side by an established thickness, said body further including a top, a first pair of spaced apart and radiused corners separating said top from first and second sides of said body, and a second pair of spaced apart and radiused corners separating said first and second sides from a bottom of said body, said first pair of radiused corners each having a first selected radii greater than a second selected radii corresponding to said second pair of radiused corners; and a beveled edge extending along said bottom and said sides, a rounded intersection edge extending along said top between said first and second sides and interconnecting at opposite ends with said beveled edge, a phosphorescent material being applied around said beveled edge and said rounded intersection edge, said rounded intersection edge defining, in combination with said beveled edge, an outer periphery of said body.

22. A multi-purpose tool useful for hanging a wallcovering, comprising:

a body having a planar front, a planar back, a top having a width, a bottom having a width, and spaced apart sides positioned between said top and said bottom, wherein said front and said back are symmetrical about a parallel plane through a center of said body and said spaced apart sides are symmetrical about a central axis from said top to said bottom, wherein said spaced apart sides and said bottom are substantially orthogonal and join at spaced apart pairs of radiused corners, wherein said width of said bottom is greater than said width of said top;

a first beveled edge formed along said bottom, said spaced apart sides, and at least one of said pairs of spaced apart radiused corners for angularly engaging a wallcovering, said first beveled edge further including a first generally inwardly extending and sloping edge and a second generally inwardly extending and sloping edge conjoining with said first edge, a second edge extending along said top and at least another of said pairs of spaced apart radiused corners, a phosphorescent material being coated around at least one of said first beveled edge and said second edge; and wherein the body is constructed of a translucent material.

* * * * *